Sept. 25, 1956     G. H. GATES ET AL     2,763,897

METHOD OF MAKING CLOSED CELL CELLULAR COMPOSITIONS

Filed Feb. 20, 1953

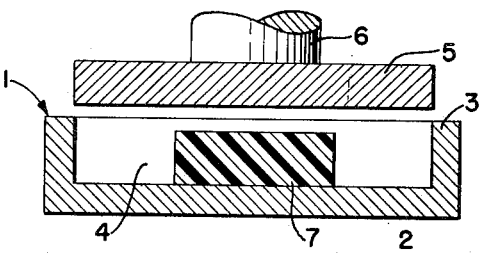

FIG. 1     PLUNGER MOLD IN OPEN POSITION

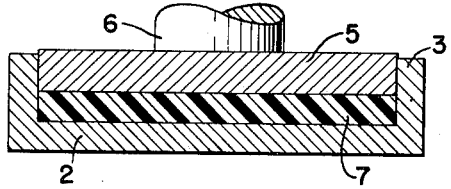

FIG. 2     BLOWABLE STOCK UNDER COMPRESSION

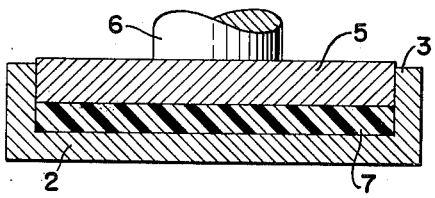

FIG. 3     BLOWING AGENT RELEASED BUT STOCK NOT EXPANDED

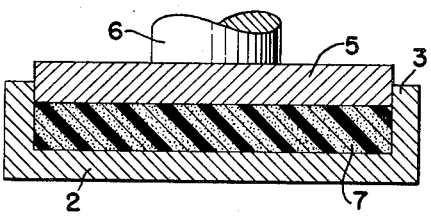

FIG. 4     STOCK EXPANDED IN RELAXED CONDITION

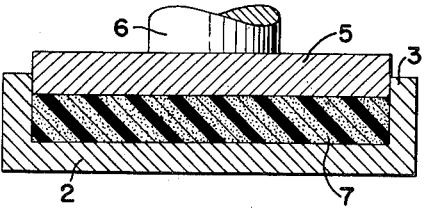

FIG. 5     VULCANIZATION OF EXPANDED STOCK

FIG. 6     DIMENSIONALLY STABLE VULCANIZED CLOSED CELL CELLULAR COMPOSITION

INVENTORS
GEORGE H. GATES
BY HAROLD J. OSTERHOF

R. L. Miller
ATTORNEY

United States Patent Office 2,763,897
Patented Sept. 25, 1956

2,763,897

METHOD OF MAKING CLOSED CELL CELLULAR COMPOSITIONS

George H. Gates, Cuyahoga Falls, and Harold J. Osterhof, Akron, Ohio, assignors, by mesne assignments, to The Goodyear Tire & Rubber Company, a corporation of Ohio Application February 20, 1953, Serial No. 337,934

12 Claims. (Cl. 18—53)

This invention relates to the manufacture of closed cell cellular compositions and articles made therefrom and more particularly to the manufacture of relatively thin articles such as shoe soles and the like made of a vulcanizable rubbery composition.

The improved process of the present invention is particularly valuable for the production of thin cellular slab stock and thin molded articles such as shoe soles in a dimensionally stable form such that the products produced can be marketed or used without subsequent stabilizing treatment.

The improved process of the present invention has the important advantage of enabling relatively small amounts of blowing agents to be used in contrast to the use of large amount of blowing agents such as have heretofore been proposed for use in making cellular products which are expanded after vulcanization or after partial vulcanization to a tough and stiff, partially vulcanized product before expansion and further vulcanization.

While the present process is more or less generally applicable to the production of cellular rubber from various vulcanizable natural and synthetic rubber compositions, it is particularly advantageous for the production of cellular shoe soles such as those described, for example, in Gates application Serial No. 619,876, filed October 2, 1945, now Patent Number 2,638,457. Such shoe sole compositions are advantageously made from a blend of a high butadiene/low styrene rubber such as GR-S, with a smaller amount of a high styrene/low butadiene resin and with the incorporation in the vulcanizable mixture of a considerable amount of mineral filler such as Silene (silicon dioxide), together with other compounding agents such as sulfur, accelerators, pigments, plasticizers, etc. Such shoe soles have the advantage of leather shoe soles without their disadvantages.

In producing cellular shoe soles and the like according to the present invention, it is desirable that the cellular shoe sole be made up of closed cells so small that the cellular nature of the shoe soles is discernable only with difficulty when viewed with the unaided eye. One advantageous form of cellular shoe sole has a specific gravity of around 0.75 to 0.95 when made from a composition which, in the solid non-cellular form, would have a density of around 1.2; so that the solid portion of the cellular shoe sole makes up the major portion of the volume, with a lesser volume of cells distributed throughout the product. Somewhat lighter shoe soles can advantageously be made having, in the form of the finished cellular shoe sole, a density of around 0.55 and in which the solid rubber composition forms somewhat less than half the volume of the cellular shoe sole. Shoe soles having a density of less than 0.55 and approaching 0.25 can also be made with the process of this invention.

According to the present invention, a vulcanizable rubber composition is made with a limited ability to expand by means of a limited amount of a blowing agent and particularly of a blowing agent which gives off nitrogen or similar inert gas. A predetermined definite amount of the composition is placed in a press or mold and rapidly heated therein, under pressure, to a temperature which will effect decomposition of the blowing agent to form the gas before any appreciable or substantial vulcanization takes place. After sufficient gas pressure has been generated to blow the material to the final dimensions desired, the external pressure is then reduced, preferably gradually, and the charge in the mold or press is permitted to expand to substantially the desired final dimensions, particularly in thickness, before any substantial vulcanization occurs. The heating is then continued and the unvulcanized expanded material is vulcanized to completion to give slab stock or molded products of the desired size and thickness.

When a vulcanizable rubber composition of sufficient volume to fill the mold cavity is placed in a closed mold and heated under pressure, the rubber softens to a gummy mass so that under high pressure the rubber flows in the mold to completely fill it and take the shape of the mold. When thin layers of such vulcanizable stock containing a blowing agent are rapidly heated, preferably all of the blowing agent is decomposed and gas is formed in the soft gummy mass before any appreciable or substantial vulcanization takes place. In case air is entrapped in the mold when it is closed and before the charge is converted into a soft gummy condition, this air can readily be removed by temporarily eliminating the external pressure and promptly reapplying it, an operation commonly referred to as "bumping."

The present invention is based upon the discovery that a closed cell cellular composition can be made directly to size and shape in a stable condition, by employing the use of enough blowing agent so as to generate sufficient gas pressure to expand the composition directly to the final stable size desired, and by causing this expansion to take place while the compositiion is in an unvulcanized condition. By operating in this manner the heretofore separate and subsequent heat stabilization step so necessary before in producing a size stable article is now eliminated.

It is important in preparing the curable material of this invention to impart to the material a limited ability to expand to a final desired stable size by employing a measured amount of blowing agent which decomposes under heat to produce a corresponding limited amount of gas. In determining the amount of blowing agent to be used to produce the desired expansion, the amount is calculated in such a way that it takes into account not only the theoretical amount of gas necessary to produce the desired increase in volume of the stock but also takes into consideration the possible leakage of gas from the stock during expansion; the possible loss of gas by absorption into the rubber in such a way that this absorbed gas does not contribute to increasing the volume of the material; the possible failure of a portion of the blowing agent to decompose and produce gas; the greater amount of blowing agent needed to blow a stiff stock containing, for example, a reinforcing resin, than is needed to blow a less stiff or softer, more flowable stock; the need for a sufficient gas pressure above atmospheric at the end of the primary expansion of the uncured stock to permit a gas pressure approaching atmospheric to remain in the stock after it has been vulcanized and cooled to normal use temperature (about 70° F.); and similar factors. Thus, by the term "limited ability to expand" is meant the ability of the curable material to be expanded to the final stable dimension the desired article is to possess under the conditions of pressure and temperature which will exist after the material has been cured, released from the mold while hot, and cooled to normal use temperatures (about 70° F.). In all instances, it is preferred that the internal gas pressure in the final vulcanized article at normal temperature approaches atmospheric pressure.

The apparatus in which the present process is carried out may be an ordinary platen press or a closed mold with an upper or lower plunger through which pressure is applied and with provision for gradually raising or lowering one or both of the plungers to reduce the pressure from the initial pressure applied to the hot gummy mass, after it has been rapidly heated to decompose the blowing agent, and before any substantial vulcanization takes place, to a pressure approaching atmospheric pressure.

With platen presses, pressure can similarly be applied by means of a ram to one of the platens while the composition is being molded under pressure and heated to decompose the blowing agent in the soft gummy mass, with provision for gradually increasing the distance between the platens to effect gradual increase in the thickness of the slab to the desired thickness while the mass is in a soft gummy condition and before any substantial vulcanization.

It is important, as indicated above, that in making molded shoe soles or other articles or slab stock of predetermined thickness and density, a carefully weighed amount of the raw stock be placed in the mold cavity or between the platens so that when pressure is applied with rapid heating, to soften the composition and force it to flow and take the shape of the mold and to decompose the blowing agent, and when the mass is then permitted to expand against the reduced external pressure, it will have the desired density when expanded to the desired thickness.

The external pressure, which is first applied during the rapid heating of the thin layers of material in the press or mold, should be sufficient to insure that the mass is solidly compacted in its thin gummy state and held against any substantial expansion while the mass is rapidly heated in the mold to decompose the blowing agent. These pressures may range from 200 pounds per sq. in. to 2000 pounds per sq. in., depending upon the amount of blowing agent being used and the nature of the stock being blown.

After the blowing agent has decomposed, the external pressure is permitted to approach atmospheric pressure, preferably gradually, to a value of from slightly above atmospheric pressure to about 275 pounds per sq. in. on the stock. This expansion takes place relatively rapidly and of the order of from about 1 second to about 120 seconds, depending, of course, upon the rate of heating, the compounding employed and the type of stock being blown. It is preferred to adjust these conditions in such a way that the expansion will be complete within a period of up to about 5 seconds. Thus, it is desirable to adjust the rate of expansion in such a way that the unvulcanized stock is permitted to expand against a positive pressure rather than permitted to expand freely as bread dough expands in an open pan. The density of the final stock is regulated by the amount of blowing agent used. Density ranging from 0.2 to a few tenths below the density of the original stock may be obtained. Preferred densities range from 0.4 to 0.95. In all cases, however, enough blowing agent is used to cause the stock to be blown to the desired density while in an unvulcanized state and without any substantial internal gas pressure remaining at the time the stock is blown to the final size and shape desired.

The thickness of the slab stock or molded article should be such that rapid heating and decomposition of the blowing agent can take place when the charge is placed in the mold and rapidly heated to effect decomposition of the blowing agent in a still gummy unformed mass. In general, the thickness of the mass at this stage of the process should be considerably less than one inch and is advantageously less than around one-half an inch. For example, a shoe sole can be molded having a thickness before expansion of around one quarter of an inch and expanded to give a final shoe sole having a thickness of around three-eighths or one-half inch.

On examining the stock in the mold by opening the mold after various periods of time, it has been observed that the mass is still soft and gummy after heating for around 1½ to 4 minutes, depending, of course, on the formulation used. During this rapid heating, no substantial vulcanization occurs and the mass remains soft and gummy, with a tendency to stick to the mold or platen. But when the external pressure is gradually reduced, after decomposition of the blowing agent, the unvulcanized gummy mass will be caused to expand against the gradually receding platen as the pressure against the platen is reduced until the internal gas pressure reaches the pressure being exerted on the platen. The vulcanization is then carried out on the expanded product to give directly slab stock or molded articles of predetermined size and which are dimensionally stable in the sense that they do not materially expand or contract after the vulcanization has been completed and the products have been removed hot from the mold or press and cooled to room temperature.

By a curable composition which may be used in this invention is meant a composition which becomes cross-linked as into a three-dimensional structure through the use of heat and a cross-linking agent. An example of a curable composition is natural rubber or a GR–S type of rubber which is cured with sulfur. Another example of a curable composition is polychlorobutadiene (Neoprene) which is cured with the use of zinc oxide.

Primarily, the invention concerns the treatment of any curable rubbery material and especially the rubbery dienes as, for example, the rubbery copolymers of styrene and butadiene-1,3 (GR–S), the rubbery copolymers of butadiene-1,3 and acrylonitrile (Perbunan), the rubbery copolymers of butadiene-1,3 (polybutadiene), the rubbery polymers of isoprene (polyisoprene), the rubbery copolymers of isoprene and styrene, and the rubbery copolymers of butadiene-1,3 and vinyl pyridine.

Various nitrogen blowing agents, that is, agents which by chemical reaction or thermal decomposition give off nitrogen, can be used in the process. Such agents decompose at temperatures which are in general below that required for rapid vulcanization. The heating of the initial mass under pressure can be carried out at temperatures above that of decomposition of the blowing agent and below that of vulcanization, with nitrogen blowing agents which decompose at lower temperatures. But the process can advantageously be carried out in a press with rapid heating between platens or plungers which are heated to the vulcanizing temperature, e. g., around 320° F. to 340° F.

Illustrative of nitrogen blowing agents which may be used, are alpha, alpha′, azo bis-isobutyronitrile (Porofor N), diazoamino benzene (Unicel), N, N′ dinitroso pentamethylene tetramine (Unicel ND), p-p′-oxy-bis phenylene sulfonyl hydrazide (Celogen), and p-terbutyl benzoyl azide.

The invention will be understood by reference to the following more detailed description when considered in connection with the accompanying drawing in which:

Fig. 1 is a view in cross section showing a plunger type mold in open position;

Fig. 2 is a view partly in cross section showing the plunger mold holding a quantity of blowing stock under pressure;

Fig. 3 is a view partly in cross section showing the stock in unexpanded and uncured condition during release of the blowing agent;

Fig. 4 is a view partly in cross section showing the stock in expanded cured condition immediately after it has expanded against a decreasing solid pressure;

Fig. 5 is a view partly in cross section showing vulcanization of the expanded stock;

Fig. 6 is a view partly in cross section showing a dimensionally stable vulcanized closed cell cellular composition after it has assumed normal room temperatures.

Since the advantages of the present invention are attained because the stock is allowed to expand before any substantial vulcanization is imparted to the stock, it becomes important to provide the proper type of confining means for the stock during the time it is allowed to expand.

A suitable means is shown in the drawing at Fig. 1 which discloses a plunger type mold 1 which comprises a lower mold element consisting of a bottom portion 2 and side members 3 which cooperate with the bottom to form a mold cavity 4. The top of the cavity 4 is enclosed to form an enclosure by means of plunger 5 actuated to operating position by a ram partly shown at 6. Also, the mold 1 may be moved upwardly toward the plunger 5 which is held at fixed position by the member 6. The mold cavity may be of any desired shape. For convenience, a rectangular shaped mold is shown in the drawing. A slug of blowable material 7 received in the cavity 4 is ready to be pressed into the shape of the mold cavity.

Fig. 2 shows the enclosure formed by the plunger 5, which enclosure is now filled with the blowable and curable stock 7. A weighed amount of the curable stock placed in the cavity 4 is caused to flow into position and take the form of the cavity under the forces exerted by the plunger 5 by means of the ram 6.

After the blowing agent has decomposed to a point where sufficient internal gas pressure has been developed, as shown in Fig. 3, the stock is then permitted to expand slowly to the density or volume desired.

Fig. 4 show the stock immediately after it has been expanded in the uncured state. At this point the plunger 5 while originally exerting a pressure anywhere from 200 to 2000 pounds per square inch on the stock may now only be exerting from near 0 pounds to about 100 pounds per square inch above atmospheric pressure. In those instances where near theoretical amounts of blowing agent are used to produce the desired reduction in density, the pressure above atmospheric within the body of the composition after the stock has expanded to the desired density may approach zero.

The expanded stock is then vulcanized, as shown in Fig. 5. After vulcanization has been completed, the cellular composition may be either cooled in the mold and then removed in a dimensionally stable condition or removed immediately from the mold in a hot condition. When removed from the mold in a hot condition, the vulcanized article will expand slightly due to thermal effects but soon will shrink back to approximately mold size as the article approaches room temperature and will remain at substantially mold size throughout the useful life of the article, as indicated in Fig. 6.

The improved method of forming stable closed cell cellular articles can be practiced using a blowable and curable composition made in accordance with the following general formula, all parts being by weight:

Rubber _____ 100 parts.
Reinforcing resin_____ 0–100 parts.
Filler (clay, HiSil, silene, 0–200 parts.
  etc.).
Antioxidant _____ As needed (generally 1–2.5) parts.
Curing agents (sulfur, etc.) As needed (generally 1.5–3.5) parts.
Accelerator of vulcanization As needed (generally .25–2.0) parts.
Softener (oils, etc.)_____ 5–20 parts.
Blowing agent_____ As needed to get proper blow.
Activator for blowing agent As needed (generally 1–5 (benzoic acid, etc.). parts.)
Accelerator activators (ZnO, 3–5 parts. (etc.).

The rubber is compounded into a curable and blowable composition by blending the rubber on a mill or in a Banbury mixer with the other ingredients except the blowing agent and curing agent in accordance with standard rubber compounding practice until a homogeneous blend of the materials is obtained. The curing agent and blowing agent are then blended into the compounded stock. A weighed amount of the resulting composition is inserted into a desired mold cavity, for example, of the type shown in the drawing, and heated rapidly under pressure sufficient to form the composition to the shape of the mold. After the blowing agent has decomposed, the composition is permitted to expand by decreasing the pressure being exerted on the composition to the final dimensions desired in the finished article. The expanded composition is vulcanized to the desired final state of cure. The cured artcle is removed from the mold without cooling. The article is permitted to cool to room temperature at which temperature it assumes substantially the final dimension desired.

In the general formula above, a "reinforcing resin" is one resulting from the polymerization of a mixture comprising 70 to 95 parts of a vinyl aromatic monomer such as styrene and 30 to 5 parts of a conjugated diene hydrocarbon such as butadiene-1,3. More specifically, the resins are those disclosed in Gates application Serial No. 619,876 filed October 2, 1945. It is preferred to use a resin in which 80 to 90 parts of styrene are present and more desirably 85 parts of styrene are present in the reaction, with butadiene present in amount to make up a total of 100 parts of the two monomers. When the resin is used, it is preferred to use it in amounts from 10 to 60 parts per 100 parts of rubber. The resulting cellular products are more stiff using the resin than when omitting the resin.

Any of the well-known antioxidants for rubber may be used, such as phenyl beta naphthylamine. Any of the well-known activators of vulcanization may be used, such as mercaptobenzothiazole and dibenzothiazyl disulfide.

The following examples illustrate specific conditions of compounding and processing that may be used in carrying out the present invention. All parts are by weight unless otherwise identified.

*Example 1*

The following formulation was used in making cellular natural rubber in accordance with the present invention:

| | Parts |
|---|---|
| Natural rubber | 100 |
| Clay | 50 |
| Zinc oxide | 5 |
| Stearic acid | 1 |
| Process oil | 5 |
| Mercaptobenzothiazole disulfide | 1.25 |
| Benzoic acid | 4 |
| Sulfur | 3 |
| Celogen | 1.75 |

The natural rubber was banded on a cold mill (80–85° F.) together with the other ingredients except sulfur and Celogen in accordance with standard rubber compounding practice until a homogeneous blend of the materials was obtained. The sulfur and Celogen were then blended into the stock to produce a blend having a specific gravity of 1.20. One hundred twenty parts of the blended rubber stock were inserted into a 6″ x 6″ x 1⅛″ mold cavity of the plunger type described in the drawing, which mold was heated to a temperature of 340° F. at the time the stock was placed in the cavity. The mold was closed under a pressure of 220–250 pounds per sq. in., on the stock, forcing the rubber stock to take the shape of the mold. The stock was held under this pressure and temperature for a period of 1.5 minutes in order to cause the blowing agent to decompose, after which time the mold was allowed to separate slowly to permit the stock to expand against a pressure approaching zero (about 5 pounds per sq. in.) and from a thickness of .169″ to a thickness of .405″.

The opposing surfaces of the mold moved away from each other a total distance of .236" in 65 seconds.

The expanded stock was vulcanized for 7.3 minutes in the mold heated to 340° F. The vulcanized stock, after being removed from the mold and then cooled to room temperature (72° F.), remained at the size occupied in the mold at the end of the expansion period of 6" x 6" x .405".

*Example 2*

The following formula was used in making a cellular article of GR–S in accordance with the present invention:

| | Parts |
|---|---|
| GR–S | 100 |
| Clay | 50 |
| Silicon dioxide (HiSil) | 30 |
| Process oil | 10 |
| Coumarone/indene resin | 5 |
| Zinc oxide | 5 |
| Stearic acid | 1.5 |
| Mercaptobenzothiazole disulfide | 1.25 |
| Diorthotolyl guanidine | .3 |
| Polyethylene glycol (Carbowax) | 1.5 |
| Benzoic acid | 4.0 |
| Sulfur | 2.5 |
| Celogen | 1.75 |

The components of this formula were blended in the same manner described for the components blended in Example 1 to produce a blended stock having a specific gravity of 1.26. The same conditions of molding and vulcanization were carried out as described for Example 1 with the exception that the stock expanded against a pressure approaching zero (about 5 pounds per sq. in.) and from a thickness of 1.156" to a thickness of 1.405", taking the opposing surfaces of the mold 65 seconds to travel a total distance of .249". The resulting vulcanized article remained at a substantially constant size of 6" x 6" x .405".

*Example 3*

The following formula was used in making a cellular Neoprene stock in accordance with the present invention:

| | Parts |
|---|---|
| Neoprene | 100 |
| Clay | 50 |
| Silicon dioxide | 20 |
| Stearic acid | 1.5 |
| Magnesium oxide | 4 |
| Zinc oxide | 5 |
| Process oil | 10 |
| Benzoic acid | 4 |
| Polyethylene glycol | 1 |
| Celogen | 1.75 |

The components of this formula were blended in the same manner as disclosed for the components in Example 2.

A measured amount of the resulting blend of components, having a specific gravity of 1.40, was molded and vulcanized in the same manner as described in Example 2 with the exception that the uncured stock expanded against a pressure approaching zero (about 5 pounds per sq. in.) and from a thickness of 0.146" to a thickness of 0.405". The opposing surfaces of the mold traveled apart a total distance of .259" in 63 seconds. The resulting vulcanized stock, after reaching room temperature, remained at a size of 6" x 6" x .405".

*Example 4*

The following formula was used in making a cellular Buna N type of article in accordance with the present invention:

| | Parts |
|---|---|
| Buna N (copolymer 67% butadiene and 33% acrylonitrile) | 100 |
| Clay | 50 |
| Silicon dioxide | 20 |
| Zinc oxide | 5 |
| Stearic acid | 1 |
| Process oil | 10 |
| Coumarone resin | 10 |
| Mercaptobenzothiazole disulfide | 1.5 |
| Polyethylene glycol | 1 |
| Benzoic acid | 4 |
| Sulfur | 1.75 |
| Celogen | 1.75 |

The above components were blended into a homogeneous mixture in the manner described for the components in Example 1 above to produce a blended composition having a specific gravity of 1.22.

The blowable composition was molded and vulcanized in the same manner described for molding the blowable composition of Example 1, with the exception that the stock expanded against a pressure approaching zero (about 5 pounds per sq. in.) and from a thickness of 0.160" to a thickness of .405", during which time the opposing surfaces of the mold traveled a distance of .245" in 60 seconds. The resulting vulcanized stock remained dimensionally stable at a size of 6" x 6" x .405".

While certain representative embodiments and details have been shown for the purpose of illustrating the invention, it will be apparent to those skilled in this art that various changes and modifications may be made therein without departing from the spirit or scope of the invention.

We claim:

1. The method of forming a cellular, closed cell, gas-expanded article, which comprises heating under positive pressure a curable material containing (1) a nitrogen producing bowing agent which decomposes at a temperature below the vulcanization temperature of the curable material, (2) a vulcanization agent and (3) a vulcanization accelerator, which vulcanization agent and vulcanization accelerator induce vulcanization of the curable material only at a temperature above the decomposition temperature of the blowing agent, to a temperature of the decomposition temperature of the blowing agent and at a temperature below the vulcanization temperature of the curable material, gradually releasing the pressure on the uncured material to allow the material to expand to a desired final dimension, and then vulcanizing the expanded material at a temperature above the decomposition temperature of the blowing agent to a desired final state of cure.

2. The method according to claim 1 in which the uncured material is allowed to expand to the limit of its ability to expand.

3. The method according to claim 1 in which the heating is done in an enclosed space.

4. The method according to claim 3 in which the expansion of the uncured material is done in one direction of its dimension.

5. The method according to claim 4 in which the expansion is done against a positive solid pressure.

6. The method according to claim 5 in which the pressure approaches atmospheric pressure.

7. The method according to claim 6 in which the gradual approach to atmospheric pressure occurs over a period ranging from one to 120 seconds.

8. The method according to claim 7 in which the curable material is a rubbery diene.

9. The method according to claim 8 in which the rubbery diene is a copolymer of butadiene and styrene.

10. The method according to claim 9 in which the rubbery material is blended with a resinous copolymer of butadiene and styrene.

11. The method according to claim 10 in which the initial confining pressure is in the range of from about 200 pounds per square inch to 2000 pounds per square inch.

12. The method according to claim 11 in which the resinous copolymer is present in amount up to 100 parts per 100 parts of curable material.

References Cited in the file of this patent

UNITED STATES PATENTS

| | | |
|---|---|---|
| 1,515,475 | Goodwin | Nov. 11, 1924 |
| 1,877,527 | Moran | Sept. 13, 1932 |
| 2,291,213 | Cuthbertson | July 28, 1942 |
| 2,546,868 | Pfleumer | Mar. 27, 1951 |